United States Patent
Tedrow et al.

(10) Patent No.: US 11,774,012 B2
(45) Date of Patent: Oct. 3, 2023

(54) APPARATUS FOR HIGH PRESSURE CONNECTION

(71) Applicant: ASML Netherlands B.V., Veldhoven (NL)

(72) Inventors: Jon David Tedrow, San Diego, CA (US); David Bessems, San Diego, CA (US); Wei-Hsun Chen, Poway, CA (US)

(73) Assignee: ASML Netherlands B.V., Veldhoven (NL)

( * ) Notice: Subject to any disclaimer, the term of this patent is extended or adjusted under 35 U.S.C. 154(b) by 280 days.

(21) Appl. No.: 17/270,658

(22) PCT Filed: Aug. 12, 2019

(86) PCT No.: PCT/EP2019/071531
§ 371 (c)(1),
(2) Date: Feb. 23, 2021

(87) PCT Pub. No.: WO2020/057859
PCT Pub. Date: Mar. 26, 2020

(65) Prior Publication Data
US 2021/0262593 A1    Aug. 26, 2021

Related U.S. Application Data

(60) Provisional application No. 62/732,845, filed on Sep. 18, 2018.

(51) Int. Cl.
*F16L 13/02* (2006.01)
*F16L 9/02* (2006.01)
*H05G 2/00* (2006.01)

(52) U.S. Cl.
CPC ............... *F16L 13/02* (2013.01); *F16L 9/02* (2013.01); *H05G 2/006* (2013.01)

(58) Field of Classification Search
CPC ............ F16L 13/02; F16L 9/02; H05G 2/006
See application file for complete search history.

(56) References Cited

U.S. PATENT DOCUMENTS 4,632,283 A    12/1986  Arakawa et al.
4,708,327 A    11/1987  Waltenspuhl
(Continued)

FOREIGN PATENT DOCUMENTS

CN    86104548 A    8/1987
CN    1782122 A     6/2006
(Continued)

OTHER PUBLICATIONS

Christopher Smith, European Patent Office International Searching Authority, International Search Report and Written Opinion, corresponding PCT Application No. PCT/EP2019/071531, dated Dec. 18, 2019, 13 pages total.

(Continued)

*Primary Examiner* — Nicole M Ippolito
*Assistant Examiner* — Hanway Chang
(74) *Attorney, Agent, or Firm* — DiBerardino McGovern IP Group LLC

(57) ABSTRACT

A conduit suitable for use in a high temperature, high pressure environment, the conduit having an elongate portion made of a first refractory metal and a fitting portion made of a second refractory metal attached to an axial end of the elongate portion. The attachment may be made by welding and the second refractory metal may have a greater yield strength than the first refractory metal.

15 Claims, 3 Drawing Sheets

(56) References Cited

U.S. PATENT DOCUMENTS

| | | |
|---|---|---|
| 6,657,213 B2 | 12/2003 | Orsini et al. |
| 7,378,673 B2 | 5/2008 | Bykanov et al. |
| 7,589,337 B2 | 9/2009 | Bykanov et al. |
| 7,838,854 B2 | 11/2010 | Algots et al. |
| 8,710,472 B2 | 4/2014 | Ishihara et al. |
| 9,381,482 B2 | 7/2016 | Kataza et al. |
| 9,642,234 B2 | 5/2017 | Lee et al. |
| 10,065,238 B2 | 9/2018 | Ovenstone et al. |
| 2006/0151320 A1 | 7/2006 | Weigert et al. |
| 2010/0148094 A1 | 6/2010 | Penhale et al. |
| 2014/0333063 A1 | 11/2014 | Nelli et al. |
| 2017/0203238 A1 | 7/2017 | Ishihara et al. |
| 2018/0044806 A1 | 2/2018 | Deane |
| 2018/0364580 A1 | 12/2018 | Dijksman et al. |

FOREIGN PATENT DOCUMENTS

| | | |
|---|---|---|
| CN | 1860321 A | 11/2006 |
| CN | 105189012 A | 12/2015 |
| EP | 0209399 A2 | 1/1987 |
| JP | 2000202600 A | 7/2000 |
| JP | 2006161159 A | 6/2006 |
| JP | 5729421 B2 | 6/2015 |
| JP | 2015168006 A | 9/2015 |
| JP | 2018517050 A | 6/2018 |
| WO | 2005047745 A2 | 5/2005 |
| WO | 2016071972 A1 | 5/2016 |

OTHER PUBLICATIONS

Office Action, counterpart Chinese Patent Application No. 201980060372.4, dated Jun. 10, 2022, 11 pages total (including English translation of 5 pages).

Office Action, counterpart Taiwanese Patent Application No. 108129964, dated Oct. 11, 2022, 15 pages total (including English translation of 6 pages).

Office Action, counterpart Chinese Patent Application No. 201980060372.4, dated Jan. 12, 2023 9 pages total (including English translation of 5 pages).

JPO, Office Action, counterpart Japanese Patent Application No. 2021-510218, dated Jul. 10, 2023, 7 pages total (including English translation of 4 pages).

APPARATUS FOR HIGH PRESSURE CONNECTION

CROSS-REFERENCE TO RELATED APPLICATIONS

This application claims priority of U.S. application 62/732,845 which was filed on Sep. 18, 2018 and which is incorporated herein in its entirety by reference.

FIELD

This disclosure relates to connection of lines carrying material under a high pressure as in the supply of target material in a source of extreme ultraviolet radiation.

BACKGROUND

Extreme ultraviolet ("EUV") light, e.g., electromagnetic radiation having wavelengths of around 50 nm or less (also sometimes referred to as soft x-rays), and including light at a wavelength of about 13.5 nm, is used in photolithography processes to produce extremely small features on substrates such as silicon wafers. Here and elsewhere herein the term "light" is used even though it is understood that the radiation described using that term may not in the visible part of the spectrum.

Methods for generating EUV light include converting a target material from a liquid state into a plasma state. The target material preferably includes at least one element, e.g., xenon, lithium or tin, with one or more emission lines in the EUV range. In one such method, often termed laser produced plasma ("LPP"), the required plasma can be produced by using a laser beam to irradiate a target material having the required line-emitting element.

The target material may take one of many forms. It may be solid or molten. If molten, it may be dispensed in several different ways such as in a continuous stream or as a stream of droplets. As an example, the target material in much of the discussion which follows is molten tin dispensed as a stream of droplets. It will be understood by one of ordinary skill in the art, however, that other forms of material and delivery modes may be used.

Thus, one LPP technique involves generating a stream of target material droplets and irradiating at least some of the droplets with laser light pulses in a vacuum chamber. In more theoretical terms, LPP light sources generate EUV radiation by depositing laser energy into a target material having at least one EUV emitting element, creating a highly ionized plasma with electron temperatures of several 10's of eV.

The energetic radiation generated during de-excitation and recombination of these ions is emitted from the plasma in all directions. In one common arrangement, a near-normal-incidence mirror (often termed a "collector mirror" or simply a "collector") is positioned to collect, direct, and, in some arrangements, focus the light to an intermediate location. The collected light is then relayed from the intermediate location to a set of scanner optics and ultimately to a substrate.

The stream of droplets is generated by a target material dispenser such as a droplet generator. The portion of the droplet generator that releases the droplets, sometimes referred to as the nozzle or the nozzle assembly, is located within the vacuum chamber. The droplet generator nozzle assembly requires a constant supply of target material. This target material is typically provided from a supply of target material maintained in a target material reservoir. Target material must be transferred from the target material reservoir to the nozzle assembly. This can be accomplished using a heated conduit which is under relatively high pressure and must be maintained above the melting point of the target material. The conduit can be made of TaW (tantalum tungsten) and provided with compression fittings made of Mo (molybdenum).

This existing configuration for the conduit has limited life and functionality. A heated conduit as described and provided with compression fittings can withstand only a single heat up-cool down cycle and still maintain a liquid tight seal. Also, breaking the connection may cause scoring or galling of sealing end faces which will limit the quality and lifetime of the seal produced by the coupling assembly. Galling is a form of wear caused by adhesion between sliding surfaces. When a material galls, some of it is pulled with the contacting surface, especially if there is a large amount of force compressing the surfaces together.

There is thus a need for a high pressure, high temperature delivery conduit with a longer useful lifetime and which can be used in a greater number of applications.

SUMMARY

The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

In one aspect, there is provided an EUV light source in which a heated, pressurized line carrying molten target material from a target material reservoir to the nozzle assembly is a high pressure conduit provided with at least one fitting where the conduit and the fitting are made of different materials. The fitting may be welded to the conduit rather than be attached using a compression fitting. The conduit may be made of TaW2.5 (2.5% tungsten) and the fitting(s) may be made of TaW10 (10% tungsten). The fitting material is able to maintain a higher hardness level which prolongs the life of the sealing surfaces.

According to another aspect of an embodiment there is provided an apparatus comprising a conduit portion made of a first refractory metal and a fitting portion attached to an axial end of the conduit portion, the fitting portion being made of a second refractory metal having greater yield strength than the first refractory metal. The fitting portion may be welded to an axial end of the conduit portion. The first refractory metal may comprise TaW2.5. The second refractory metal may comprise TaW10.

According to another aspect of an embodiment there is provided an apparatus comprising a conduit portion comprising TaW2.5 and a fitting portion welded to an axial end of the conduit portion, the fitting portion comprising TaW10.

According to another aspect of an embodiment there is provided an EUV light source target material delivery system adapted to deliver target material to an irradiation region of an EUV light source, the target material delivery system comprising a target material reservoir, a conduit having in fluid communication with said target material reservoir, and a nozzle assembly in fluid communication with the conduit, wherein the conduit comprises a conduit portion made of a first refractory metal and at least one fitting portion attached to an axial end of the conduit portion, the at least one fitting portion being made of a second refractory having a greater yield strength than the first refractory metal. The at least one fitting portion may be welded to an axial end of the conduit portion. The first refractory metal may comprise TaW2.5. The second refractory metal may comprise TaW10.

According to another aspect of an embodiment there is provided a method of making a conduit comprising the steps of providing an elongate conduit portion made of a first refractory metal, providing a fitting portion attached to an axial end of the elongate conduit portion, the fitting portion comprising a second refractory metal having a greater yield strength than the first refractory metal, and attaching the fitting portion to the elongate conduit portion. The step of attaching the fitting portion to the elongate conduit portion may comprise welding the fitting portion to the elongate conduit portion. The first refractory metal may comprise TaW2.5. The second refractory metal may comprise TaW10.

Further embodiments, features, and advantages of the subject matter of the present disclosure, as well as the structure and operation of the various embodiments are described in detail below with reference to accompanying drawings.

Figure 1:
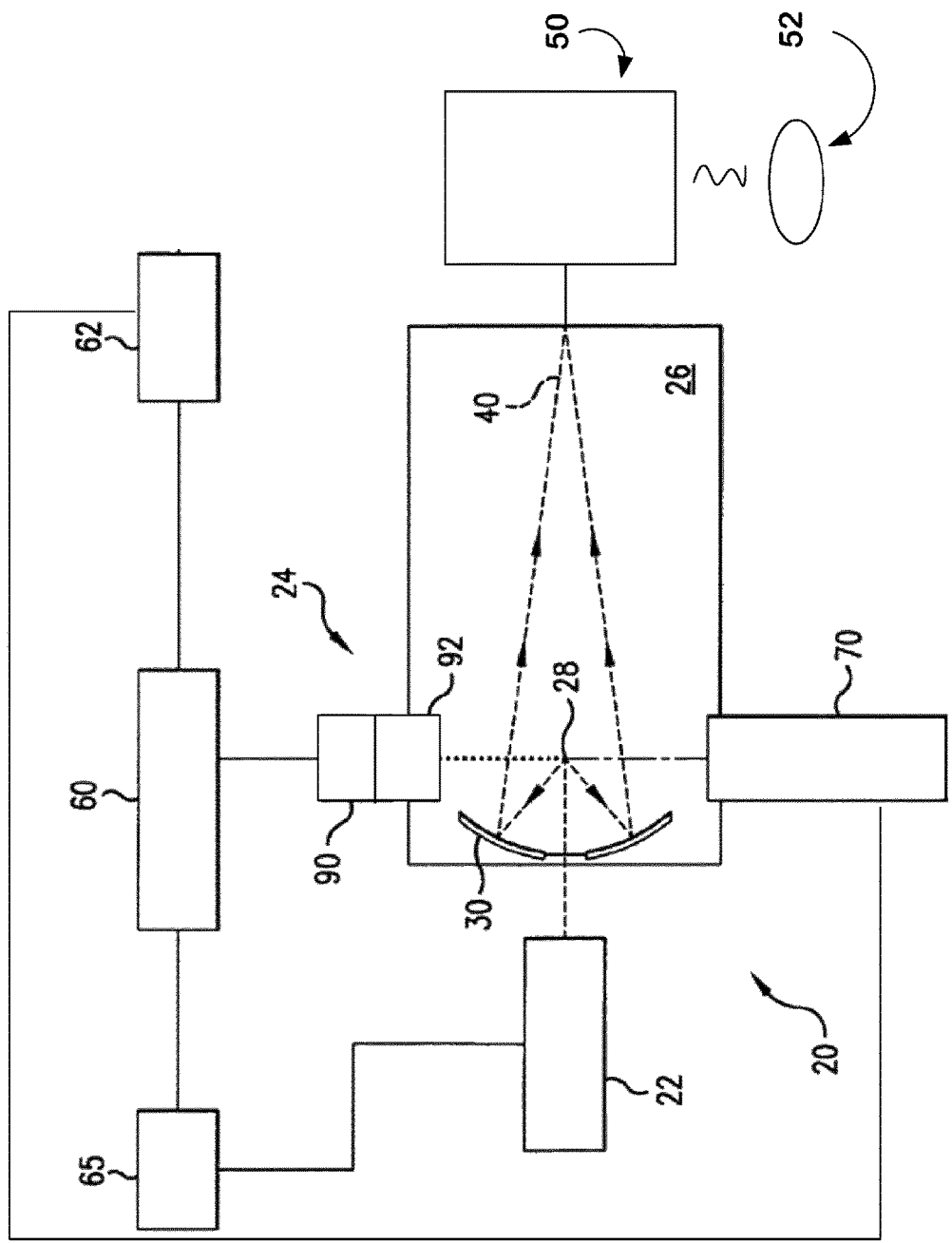
FIG. 1 shows a schematic, not to scale, view of an overall broad conception for a laser-produced plasma EUV light source system according to an aspect of the present invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below.

With initial reference to FIG. 1 there is shown a schematic view of an exemplary EUV light source, e.g., a laser produced plasma EUV light source 20 according to one aspect of an embodiment of the present invention. As shown, the EUV light source 20 may include a pulsed or continuous laser source 22, which may for example be a pulsed gas discharge CO2 laser source producing radiation at 10.6 µm. The pulsed gas discharge CO2 laser source may have DC or RF excitation operating at high power and high pulse repetition rate.

The EUV light source 20 also includes a target delivery system 24 for delivering target material in the form of liquid droplets or a continuous liquid stream. The target material may be made up of tin or a tin compound, although other materials could be used. The target delivery system 24 introduces the target material into the interior of a chamber 26 to an irradiation region 28 where the target material may be irradiated to produce plasma. In some cases, an electrical charge is placed on the target material to permit the target material to be steered toward or away from the irradiation region 28. It should be noted that as used herein an irradiation region is a region where target material irradiation may occur, and is an irradiation region even at times when no irradiation is actually occurring.

Continuing with FIG. 1, the light source 20 may also include one or more optical elements such as a collector 30. The collector 30 may be a normal incidence reflector, for example, implemented as a multilayer mirror or "MLM," that is, a SiC substrate coated with a Mo/Si multilayer with additional thin barrier layers deposited at each interface to effectively block thermally-induced interlayer diffusion. Other substrate materials, such as Al or Si, can also be used. The collector 30 may be in the form of a prolate ellipsoid, with an aperture to allow the laser light to pass through and reach the irradiation region 28. The collector 30 may be, e.g., in the shape of a ellipsoid that has a first focus at the irradiation region 28 and a second focus at a so-called intermediate point 40 (also called the intermediate focus) where the EUV light may be output from the EUV light source 20 and input to, e.g., an integrated circuit lithography tool 50 which uses the light, for example, to process a silicon wafer work piece 52 in a known manner. The silicon wafer work piece 52 is then additionally processed in a known manner to obtain an integrated circuit device.

The EUV light source 20 may also include an EUV light source controller system 60, which may also include a laser firing control system 65, along with, e.g., a laser beam positioning system (not shown). The EUV light source 20 may also include a target position detection system which may include one or more droplet imagers 70 that generate an output indicative of the absolute or relative position of a target droplet, e.g., relative to the irradiation region 28, and provide this output to a target position detection feedback system 62. The target position detection feedback system 62 may use this output to compute a target position and trajectory, from which a target error can be computed. The target error can be computed on a droplet-by-droplet basis, or on average, or on some other basis. The target error may then be provided as an input to the light source controller 60. In response, the light source controller 60 can generate a control signal such as a laser position, direction, or timing correction signal and provide this control signal to a laser beam positioning controller (not shown). The laser beam positioning system can use the control signal to control the laser timing circuit and/or to control a laser beam position and shaping system (not shown), e.g., to change the location and/or focal power of the laser beam focal spot within the chamber 26.

As shown in FIG. 1, the light source 20 may include a target delivery control system 90. The target delivery control system 90 is operable in response to a signal, for example, the target error described above, or some quantity derived from the target error provided by the system controller 60, to correct for errors in positions of the target droplets within the irradiation region 28. This may be accomplished, for example, by repositioning the point at which the target delivery mechanism 92 releases the target droplets. The target delivery mechanism 92 extends into the chamber 26 and is also externally supplied with target material and a gas source to place the target material in the target delivery mechanism 92 under pressure.

Figure 2:
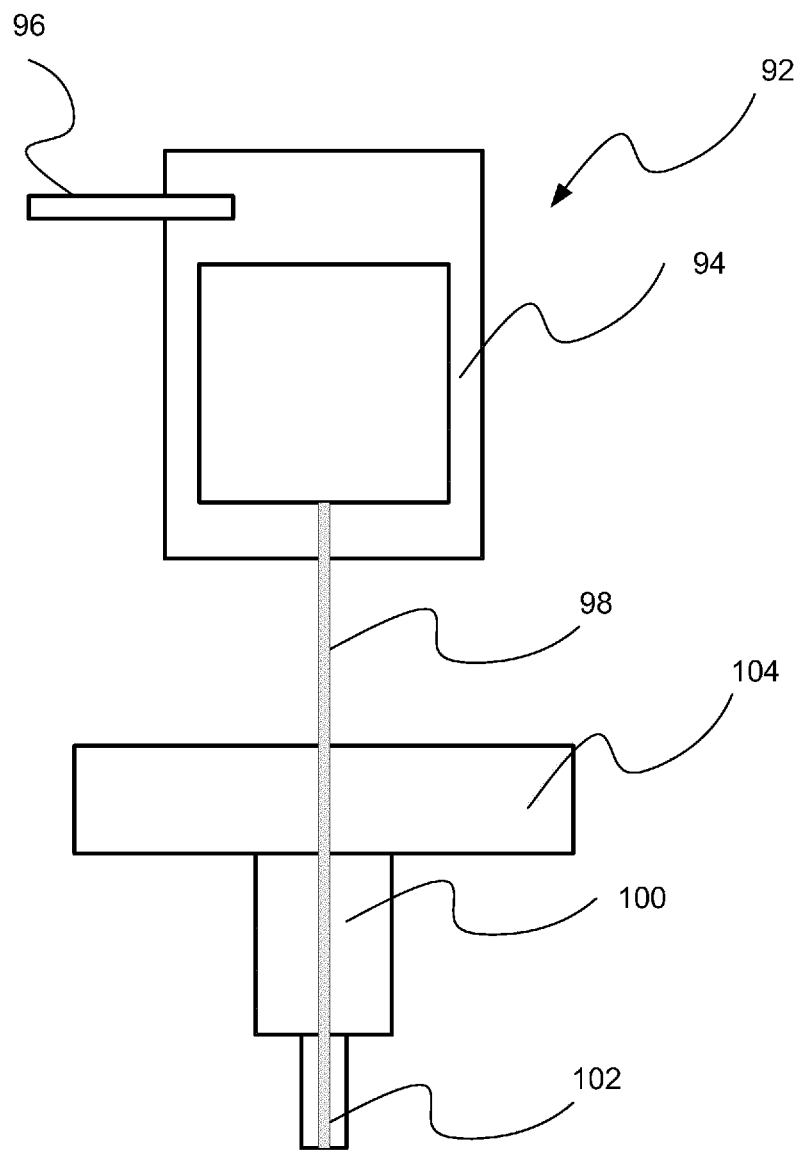
FIG. 2 is a plan view of a droplet dispenser such as could be used in an EUV light source such as that shown in FIG. 1.

FIG. 2 shows in greater detail a target delivery mechanism 92 for delivering target material into the chamber 26. For the generalized embodiment shown in FIG. 2, the target delivery mechanism 92 may include a reservoir 94 holding a molten target material such as tin. Heating elements (not shown) controllably maintain the target delivery mechanism 92 or selected sections thereof at a temperature above the melting temperature of the target material. The molten target material may be placed under pressure by using an inert gas such as argon introduced through a feed line 96. The pressure forces the target material to pass through a supply conduit 98 which conveys the molten target material to valve 100 and nozzle 102. The supply conduit 98 is heated and may include one or more filters. This supply conduit 98 may be made of a tantalum tungsten alloy and is connected to maintain a liquid tight seal with other components in the system with compression fittings which may be made of molybdenum. The supply conduit line 98 is preferably flexible to permit relative motion of the reservoir 94 and the nozzle 102.

The valve 100 may be a thermal valve. A thermoelectric device such as a Peltier device may be employed to establish the valve 100, freezing target material between the reservoir 94 and nozzle 102 to close the valve 100 and heating the solidified target material to open the valve 100. FIG. 2 also shows that the target delivery mechanism 92 is coupled to a movable member 104 such that motion of the movable member 104 changes the position of the point at which droplets are released from the nozzle 102. Motion of the movable member 104 is controlled by a droplet release point positioning system.

For the target delivery mechanism 92, one or more modulating or non-modulating target material dispensers may be used. For example, a modulating dispenser may be used having a capillary tube formed with an orifice. The nozzle 102 may include one or more electro-actuatable elements, e.g. actuators made of a piezoelectric material, which can be selectively expanded or contracted to deform the capillary tube and modulate a release of source material from the nozzle 102. Examples of modulating droplet dispensers can be found in U.S. Pat. No. 7,838,854, issued Nov. 23, 2010, titled "Method and Apparatus for EUV Plasma Source Target Delivery", U.S. Pat. No. 7,589,337, issued Sep. 15, 2009, titled "LPP EUV Plasma Source Material Target Delivery System", and U.S. Pat. No. 7,378,673, issued May 27, 2008, titled, "Source Material Dispenser for EUV Light Source", the entire contents of each of which are hereby incorporated by reference herein.

According to one aspect of an embodiment, the supply conduit 98 and other heated, high pressure lines in the system are made of made of multiple refractory metals that have fittings at their ends that are welded in place. For example, the supply conduit 98 may be made of TaW2.5 (2.5% tungsten) and the fittings may be made of TaW10 (10% tungsten). Using such a material for the fittings provides for a fitting with a higher hardness level which prolongs the life of the sealing surfaces. One end of the supply conduit 98 with its fitting would connect to a mating fitting in reservoir 94 while the other end of the supply conduit 98 with its fitting would connect to nozzle 102/valve 100 assembly. It will be appreciated that the supply conduit 98 could be deployed in other parts of the system as well, and can also be deployed in systems other than those used in semiconductor photolithography.

Figure 3A:
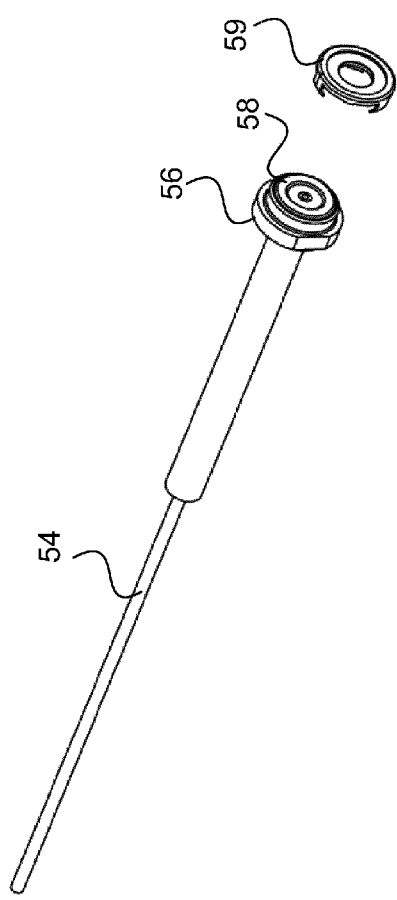
FIG. 3A is a perspective view of a high pressure line for an application such as conveying molten target material under pressure in a droplet dispenser such as that shown in FIG. 2
Figure 3B:
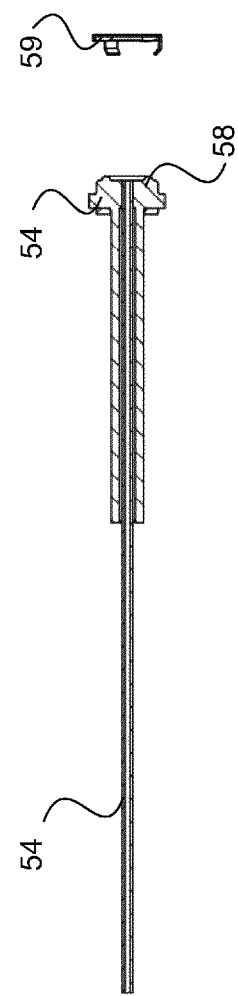
FIG. 3B is a cutaway plan view of the high pressure line of FIG. 3A.

With initial reference to FIGS. 3A and 3B, there is shown a conduit 54 which could be used as supply conduit 98 with a fitting 56. The fitting 56 has a sealing face 58. In use, the sealing face 58 is brought into axial engagement with and pressed against the sealing face of a complementary fitting. A sealing member 59 may be interposed between the two sealing faces.

As mentioned, the conduit 54 may be made of a refractory metal. Refractory metals are a class of metals that are extremely resistant to heat and wear. They include niobium, molybdenum, tantalum, tungsten, and rhenium and their alloys. They all share have a melting point above 2000° C. and high hardness at room temperature. They are chemically inert and have a relatively high density. For example, the conduit 54 may be made of TaW2.5 which is a tantalum tungsten alloy having 2.5% tungsten by weight. This material has excellent corrosion resistance to many molten metals, good weldability, and relatively good deformability. Compared with pure tantalum, this alloy has a better strength, particularly better strength. In particular, the yield strength of TaW2.5 is about 230 MPa. Yield strength or yield stress is the stress at which a material begins to deform plastically.

Also as mentioned, the fitting 56 may also be made of a refractory metal. For example, the fitting 56 may be made of TaW10 which is a tantalum tungsten alloy having 10% tungsten by weight. Compared with pure tantalum and TaW2.5 this alloy has a considerably increased strength up to very high temperatures. For example, the yield strength of TaW10 is in the range of 875-1005 MPa. TaW10 is less ductile than the other alloys and exhibits less plasticity. While it is difficult to process TaW10, making it less suitable than other materials for the conduit, it can be used for fitting portion of the high pressure line. According to one aspect of an embodiment, the fitting 56 is welded to the conduit 50 rather than attached using compression fitting to provide a durable attachment.

The fitting 56 may have a first configuration that meshes or mates with a second configuration of a complementary fitting to which it is connected. The first and second configurations lack circular symmetry, that is, they are circularly asymmetric in that they cannot be rotated by any arbitrary angle look the same. The lack of circular symmetry and complementarity creates an arrangement in which the first fitting is inhibited from turning (e.g., prevented from turning) with respect to the second fitting when they are axially engaged despite the application of unequal rotational forces to the fittings. In the example shown in FIGS. 3A and 3B, the flat area or shoulder on the fitting 56 results in a truncated circle cross section which would mate with a fitting having an aperture with a complementary internal configuration.

While the above description is in terms of the use of the novel connection in an arrangement for supplying target material in an EUV source, one of ordinary skill in the art will readily appreciate that the principles disclosed herein can also be advantageously exploited in other applications where a robust high pressure connection is needed.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Other aspects of the invention are set out in the following numbered clauses.

1. Apparatus comprising:
a conduit portion made of a first refractory metal; and
a fitting portion attached to an axial end of the conduit portion, the fitting portion being made of a second refractory metal having greater yield strength than the first refractory metal.
2. Apparatus as in clause 1 wherein the fitting portion is welded to an axial end of the conduit portion.
3. Apparatus as in clause 1 wherein the first refractory metal comprises TaW2.5.
4. Apparatus as in clause 1 wherein the second refractory metal comprises TaW10.
5. Apparatus as in clause 1 wherein the fitting portion has a circularly asymmetric cross section.
6. Apparatus comprising:
a conduit portion comprising TaW2.5; and
a fitting portion welded to an axial end of the conduit portion, the fitting portion comprising TaW10.
7. An EUV light source target material delivery system adapted to deliver target material to an irradiation region of an EUV light source, the target material delivery system comprising:
a target material reservoir;
a conduit having in fluid communication with said target material reservoir; and
a nozzle assembly in fluid communication with said conduit, wherein
the conduit comprises a conduit portion made of a first refractory metal; and at least one fitting portion attached to an axial end of the conduit portion, the at least one fitting portion being made of a second refractory having a greater yield strength than the first refractory metal.
8. Apparatus as in clause 7 wherein the at least one fitting portion is welded to an axial end of the conduit portion.
9. Apparatus as in clause 7 wherein the first refractory metal comprises TaW2.5.
10. Apparatus as in clause 7 wherein the second refractory metal comprises TaW10.
11. A method of making a conduit comprising the steps of:
providing an elongate conduit portion made of a first refractory metal;
providing a fitting portion attached to an axial end of the elongate conduit portion, the fitting portion comprising a second refractory metal having a greater yield strength than the first refractory metal; and
attaching the fitting portion to the elongate conduit portion.
12. A method as in clause 11 wherein the step of attaching the fitting portion to the elongate conduit portion comprises welding the fitting portion to the elongate conduit portion.
13. A method as in clause 11 wherein the first refractory metal comprises TaW2.5.
14. A method as in clause 11 wherein the second refractory metal comprises TaW10.
15. A method as in clause 11 wherein the fitting portion has a circularly asymmetric cross section.

What is claimed is:
1. Apparatus comprising:
a conduit portion made of a first refractory metal; and
a fitting portion attached to an axial end of the conduit portion, the fitting portion being made of a second refractory metal having greater yield strength than the first refractory metal.
2. Apparatus as claimed in claim 1 wherein the fitting portion is welded to an axial end of the conduit portion.
3. Apparatus as claimed in claim 1 wherein the first refractory metal comprises TaW2.5.
4. Apparatus as claimed in claim 1 wherein the second refractory metal comprises TaW10.
5. Apparatus as claimed in claim 1 wherein the fitting portion has a circularly asymmetric cross section.
6. Apparatus comprising:
a conduit portion comprising TaW2.5; and
a fitting portion welded to an axial end of the conduit portion, the fitting portion comprising TaW10.
7. An EUV light source target material delivery system adapted to deliver target material to an irradiation region of an EUV light source, the target material delivery system comprising:
a target material reservoir;
a conduit in fluid communication with said target material reservoir; and
a nozzle assembly in fluid communication with said conduit, wherein
the conduit comprises a conduit portion made of a first refractory metal; and at least one fitting portion attached to an axial end of the conduit portion, the at least one fitting portion being made of a second refractory having a greater yield strength than the first refractory metal.
8. The EUV light source target material delivery system as claimed in claim 7 wherein the at least one fitting portion is welded to an axial end of the conduit portion.
9. The EUV light source target material delivery system as claimed in claim 7 wherein the first refractory metal comprises TaW2.5.
10. The EUV light source target material delivery system as claimed in claim 7 wherein the second refractory metal comprises TaW10.
11. A method of making a conduit comprising the steps of:
providing an elongate conduit portion made of a first refractory metal;
providing a fitting portion attached to an axial end of the elongate conduit portion, the fitting portion comprising a second refractory metal having a greater yield strength than the first refractory metal; and
attaching the fitting portion to the elongate conduit portion.
12. A method as claimed in claim 11 wherein the step of attaching the fitting portion to the elongate conduit portion comprises welding the fitting portion to the elongate conduit portion.
13. A method as claimed in claim 11 wherein the first refractory metal comprises TaW2.5.
14. A method as claimed in claim 11 wherein the second refractory metal comprises TaW10.

15. A method as claimed in claim 11 wherein the fitting portion has a circularly asymmetric cross section.

\* \* \* \* \*